United States Patent
May et al.

(10) Patent No.: US 10,798,061 B2
(45) Date of Patent: Oct. 6, 2020

(54) AUTOMATED LEARNING OF EXTERNALLY DEFINED NETWORK ASSETS BY A NETWORK SECURITY DEVICE

(71) Applicant: Fortinet, Inc., Sunnyvale, CA (US)

(72) Inventors: Robert A. May, North Vancouver (CA); Mathieu Nantel, Blainville (CA)

(73) Assignee: Fortinet, Inc., Sunnyvale, CA (US)

( * ) Notice: Subject to any disclaimer, the term of this patent is extended or adjusted under 35 U.S.C. 154(b) by 242 days.

(21) Appl. No.: 15/935,667

(22) Filed: Mar. 26, 2018

(65) Prior Publication Data
US 2019/0297055 A1    Sep. 26, 2019

(51) Int. Cl.
*G06F 21/00*    (2013.01)
*H04L 29/06*    (2006.01)
*G06F 9/54*    (2006.01)

(52) U.S. Cl.
CPC .......... *H04L 63/0245* (2013.01); *G06F 9/547* (2013.01); *H04L 63/20* (2013.01)

(58) Field of Classification Search
CPC ..... H04L 63/20; H04L 63/02; H04L 63/0263; H04L 63/0227; H04L 63/04; H04L 63/0428; H04L 63/10
See application file for complete search history.

(56) References Cited

U.S. PATENT DOCUMENTS

2010/0192212 A1*    7/2010    Raleigh ................... H04W 4/18
726/7

* cited by examiner

*Primary Examiner* — Ghazal B Shehni
(74) *Attorney, Agent, or Firm* — Jaffery Watson Mendonsa & Hamilton LLP

(57) ABSTRACT

Systems and methods for automated learning of externally defined network assets by a network security device are provided. According to one embodiment, updated information for a network asset associated with a private network is received by a network security device from an external asset management device associated with the private network. The updated information includes a change in a definition or an attribute of the network asset. The existence of a current definition and attribute information for the network asset is determined by the network security device. The current definition and attribute information is dynamically updated based on the updated information by the network security system within a run-time representation of security policy rules within a kernel of a network security operating system without disrupting on-going application of one or more security policy rules defined for the network asset to network traffic directed to or originated by the network asset.

30 Claims, 5 Drawing Sheets

AUTOMATED LEARNING OF EXTERNALLY DEFINED NETWORK ASSETS BY A NETWORK SECURITY DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network security. More particularly, embodiments of the present invention relate to synchronization of network security devices with asset definitions and attributes that are maintained by external systems, such as virtual machine (VM) systems, asset management systems and security information event monitoring (SIEM) systems.

Description of the Related Art

A typical enterprise network may have thousands of network assets, including, but not limited to, virtual and/or physical endpoints, networking components, network security devices, laptops, servers, handheld devices and other hardware/software resources and/or components of protected network resources. Network security devices build network security policies based on knowledge of where network assets are located, what these network assets are, who owns these network assets and other information and attributes of such assets, which may be referred to herein collectively as asset definitions. In order to effectively enforce security policies for the enterprise network, network security devices need to be made aware of definitions and attributes of network assets and need to be kept apprised of changing definitions and changing attributes.

In current systems, these assets definitions and attributes are manually added and updated by a network administrator via an interface of a network security device by editing existing definitions and attributes or adding new asset classes and definitions and attributes. However, this manual process becomes burdensome as the number of asset classes and assets are at issue increase. Furthermore, delays incurred in updating such definitions and attributes may hinder the ability of network security devices to adequately protect the enterprise network. As such, asset definitions should be updated as soon as possible.

There are many situations in which network assets are tracked and defined by systems external to network security devices. Exemplary external systems include, but are not limited to, Virtual Machine (VM) systems, asset management systems and Security Information and Event Management (SIEM) systems. A typical VM system, for example, VMware VMX, Cisco ACI, etc. allows a network administrator to define networking components, endpoints, etc. easily and store asset definitions. Similarly, asset management systems, for example, IBM Tivoli etc. could hold tens or hundreds of thousands of asset definitions. STEM systems generally learn about assets based on logs, and may allow a network administrator to categorize/group the assets, depending on the capabilities of the STEM system.

In order to allow network security devices to more effectively protect an enterprise network and reduce the burden on network administrators, it would be desirable to have a mechanism by which network security devices learn of externally defined network assets in real-time as things change.

SUMMARY

Systems and methods are described for automated learning of externally defined network assets by a network security device. According to one embodiment, updated information for a network asset associated with a private network is received by a network security device from an external asset management device associated with the private network. The updated information includes a change in a definition or an attribute of the network asset. The existence of a current definition and attribute information for the network asset is determined by the network security device. The current definition and attribute information is dynamically updated based on the updated information by the network security system within a run-time representation of security policy rules within a kernel of a network security operating system without disrupting on-going application of one or more security policy rules defined for the network asset to network traffic directed to or originated by the network asset.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
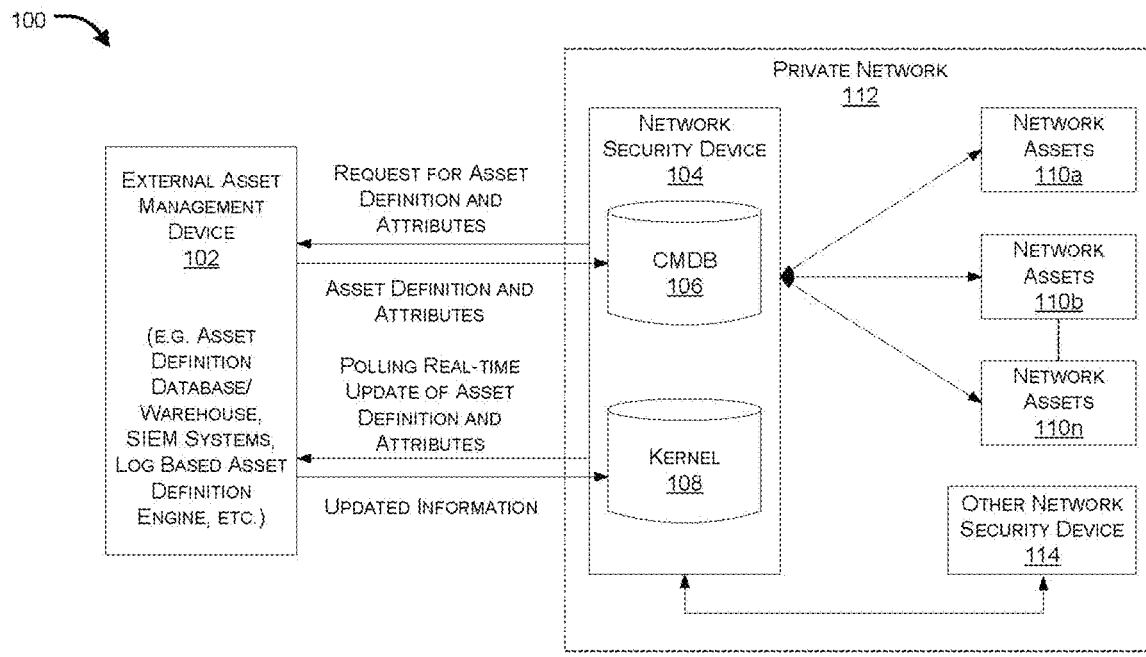
FIG. 1A is a block diagram illustrating a high-level architecture including a network security device configured to poll asset definitions and updated asset attributes from external devices in order to update a run-time security policy configuration of the network security device in accordance with an embodiment of the present invention.

Systems and methods are described for automated learning of externally defined network assets by a network security device. In one embodiment, there is no disruption to the application of a security policy associated with a network asset despite one or more attributes of the network asset being updated after definition of the security policy. A network security device associated with a private network, may receive updated information related to a network asset associated with the private network, from an external asset management device associated with the private network, determine existence of a current definition and attribute information for the network asset, and dynamically update, in kernel mode, the current definition and attribute information based on the updated information.

Additionally, systems and methods are disclosed herein for executing, at the network security device, in kernel mode, the security policy rules associated with the network asset based on the updated information by dynamically updating the run-time configuration. The execution of the security policy rules happens in the kernel of the network security operating system of the network security device with reference to the run-time configuration and therefore can continue without changing the system configuration (e.g., information stored in a configuration management database) of the network security device.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, e.g. software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "network asset" generally refers to an asset that is considered to be part of a private network. A network asset may be in the form of a physical or virtual device within the private network. Examples of network assets include end user workstations (e.g., personal computers, laptop computers), servers, storage devices, network devices (e.g., printers, switches, routers), network security devices (e.g., firewalls, IDS, IPS), network management equipment.

The phrase "log" generally refers to information that can be collected from a target network environment as a result of security visibility and network visibility. Information that can be collected as a result of network visibility includes, but is not limited to, information such as protocols, packet sizes, concurrent connections/flows, connections/flows per second, throughput. Information that can be collected as a result of security visibility includes, but is not limited to, information about security incidents, such as that detected by an intrusion prevention system (IPS) and antivirus (AV) activity, and application information derived from application control. Security visibility information may be useful to identify the type of security incidents observed within a customer site and their relative frequencies and provides information about the actual use of applications and their associated bandwidth consumption. As described further below, in embodiments of the present invention, security and network telemetry information are gathered/recorded for a specific period of time and based thereon performance related parameters, such as concurrent connections/flows, throughput and the like, can be derived by either calculating the averages or by obtaining the maximum observed values during the evaluation period.

The phrase "security device" generally refers to a hardware device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Different embodiments described herein relate to systems and methods for automated learning of externally defined network assets by a network security device. In one embodiment, a network security device associated with a private network, receives updated information associated with a network asset associated with the private network, from an external asset management device associated with the private network. In some embodiments, the network security device, responsive to receiving the updated information, determines existence of a current definition and attribute information for the network asset. In one embodiment, the network security devices dynamically updates during run time, the current definition and attribute information associated with the network asset within the kernel of the network security operating system (e.g., the FORTIOS network security operating system available from the assignee of the present invention) of the network security device based on the updated information. The current definition and attribute information may be updated during run time of the security policy without changing the system configuration of the network security device in the form of security policy rules configured by the network administrator. The current definition and attribute information may be updated during run-time, without disrupting ongoing application of security policy rules defined for the network asset to network traffic directed to or originated by the network asset.

For example, a network security device may receive updated information, such as a changed Internet Protocol (IP) address or subnet etc. associated with a network asset, from one or more external network asset management devices/systems, such as Virtual Machine (VM) systems, asset management systems or Security Information and Event Management (STEM) systems. Upon receiving the updated information, e.g., a new IP address for a network asset, the network security device determines whether the IP address relates to any existing network asset of the private network. The network security device may update the IP address of the network asset, in kernel mode during run time, without disrupting the ongoing application of a security policy at the network security device. In another words, when an asset definition or attribute information of a network device changes, for example, when the IP address of the network asset changes, the same policy may be applied if other part of the definition and attributes information remains substantially the same. The network administrator will not have to manually change any security policy configurations due to a change in IP address, which may be temporal in nature. The network security device can update the asset definition and attribute information in kernel mode and continue applying the security policy, without requiring any changes in configuration, by simply updating the IP address of the network asset, retrieved in real-time from the external asset management device.

In some embodiments, the updated information may include a change in asset definition and attribute information of the network asset at issue. In some embodiments, the change in the asset definition or the attribute information may represent a change to one or more of an asset name of the network asset, a subnet with which the network asset is associated, an off-site hostname to which the network asset belongs, a location of the network asset and a group with which the network asset is associated. In some embodiments, the change in the definition or the attribute may represent a change to one or more of an Internet Protocol (IP) address of the network asset, a Media Access Control (MAC) address of the network asset, a user ID and an exposure level.

In one embodiment, the determination of existence of a current definition and attribute information for the network asset may be based on a comparison of the current definition and attribute information with the updated information. In one embodiment, the network security device concludes that the updated information relates to a particular network asset when a majority of the current definition and most of the attributes information matches the updated information. Examples of definition and attribute information include network information (e.g., IP address, domain, hostname and the like), vulnerabilities, indicators of compromise (IOCs), a software inventory and a hardware inventory. In one embodiment, after the network asset is identified based on definition and attribute information, the run-time configuration of the network security device may be changed without impacting the system configuration. For example, if the IP address of the network asset has changed since the system configuration was loaded into the kernel of the network security operating system of the network security device, the representation of the security policy rules stored within the kernel may be modified to reflect the network asset's change of IP address. In this manner, the security policy rules applicable to a network asset whose definition and/or attribute information has changed will continue to be enforced despite the change.

In one embodiment, the updated information may be retrieved directly from one or more external asset management devices. In one embodiment, a first application programming interface (API) may be used for retrieving the updated information from a first external asset management device of the one or more external asset management devices and a second API may be used for retrieving updated information from a second external asset management device of the one or more external asset management devices.

In one embodiment, the updated information may be retrieved, by the network security device, from one or more external asset management devices, through an intermediate agent or middleware component. In one embodiment, the agent may use a first API for retrieving the updated information from a first external asset management device of the one or more external asset management devices and the agent may use a second API for retrieving the updated information from a second external asset management device of the one or more external asset management devices.

In one embodiment, the updated information may be retrieved, by the network security device, from one or more external asset management devices using a hybrid configuration in which updated information from a first external asset management device of the one or more external asset management devices may be retrieved directly by the network security device, and updated information from a second external asset management device of the one or more external asset management devices may be received indirectly through an agent or a middleware component.

In one embodiment, the updated information may be retrieved by the network security device from one or more external asset management devices associated with the private network through a push mechanism, wherein, the updated information is pushed to the network security device by the one or more external asset management devices, in real-time as definitions and/or attributes of any network asset associated with the private network are updated. In some embodiments, the updated information may be retrieved by the network security device from one or more external asset management devices associated with the private network through an active polling mechanism.

In one embodiment, the network security device may be any or a combination of an Intrusion Prevention System (IPS), an Intrusion Detection System (IDS), a gateway device, a network management device, a firewall, a Distributed Denial of Service (DDoS) prevention device, a UTM appliance and a software defined network security device.

Additionally, systems and methods are disclosed herein for executing, at the network security device, in kernel mode, the security policy associated with the network asset based on the updated information. The execution of the security policy happens in kernel mode, without changing the system configuration of the network security device.

Embodiments of the present invention are described below with reference to information (e.g., network asset definitions and/or attributes) being pushed by external systems to a network security device or pulled from external systems by a network security device. While the mechanism by which these definitions and/or attributes are communicated to the network security device is not critical to the ability of the network security device to dynamically update its run-time configuration and continue to apply security policy rules to the network assets with changed definitions, for purposes of completeness it is noted that in one embodiment the information may be communicated via a cooperative security fabric as described in copending U.S. patent application Ser. No. 15/855,230, filed Dec. 27, 2017 and entitled "Building a Cooperative Security Fabric of Hierarchically Interconnected Network Security Devices," which is hereby incorporated by reference in its entirety for all purposes.

FIG. 1A is a block diagram illustrating a high-level architecture 100 including a network security device 104 configured to poll asset definitions and updated asset attributes from external devices in order to update a run-time security policy configuration within kernel 108 in accordance with an embodiment of the present invention. In the context of the present example, a private network 112 may have a network security device 104 configured to provide security to network assets, such as such as network asset 110a, network asset 110b and network asset 110n, and work in synchronization with one or more other network security devices, such as network security device 114. For purpose of simplified description, network asset 110a, network asset 110b, and network asset 110n may be collectively and interchangeably referred to hereafter as network assets 110a-n. Network assets 110a-n include, but are not limited to, virtual and/or physical endpoints, networking components, network security devices, laptops, servers, handheld devices, printers, and other hardware/software resources and/or components of protected network resources associated with private network 112.

Network security device 104 may protect network assets 110a-n by performing one or more of a variety of network security functions, including, but not limited to, analysis of traffic originating from or directed to network assets 110a-n and application of matching security policy rules to such traffic. Network security device 104 can be any type of network security device, such as an Intrusion Prevention System (IPS), an Intrusion Detection System (IDS), a gateway device, a network management device, a firewall, a Distributed Denial of Service (DDoS) prevention device, a UTM appliance and a software defined network security device. As those skilled in the art will appreciate, there may be several network security devices like network security device 104 or other security devices, like security device 114 within private network 112, but for simplicity of the explanation only one network security device 104 and one other network security device 114 are shown here.

A network administrator may define and configure, via network security device 104, one or more security policy rules (which may also be referred to herein collectively as security policies) for each network asset associated with private network 112. Security policies may be configured on network security device 104 for each network asset based on, among other things, an application with which the traffic at issue is associated, the source address and/or destination address of the traffic at issue, the port on which the traffic at issue was received, what the network asset is, who it belongs to, what type of device it is, which group it relates to, and similar such device definition and attribute information. The device definition and attribute information may include, but is not limited to, an asset name of the network asset, a subnet within which the network asset is connected, an off-site hostname to which the network asset belongs, a location of the network asset and a group with which the network asset is associated.

In some embodiments, a change in a definition or an attribute of a network asset may represent a change to one or more of an Internet Protocol (IP) address of the network asset, a Media Access Control (MAC) address of the network asset, a user ID and an exposure level. As their may be hundreds of network assets within private network 112, it would be difficult for the network administrator to manually change the device definition and attribute information as changes occur within private network 112.

As the number of network assets may be large, keeping track of changing asset definitions and attribute information by the network security device may be cumbersome and may impact performance of the network security device. As such, in embodiments of the present invention, network security device 104 makes uses of external asset management devices 102, which keeps track of changing asset definition and attribute information of network assets 110a-n. Network security device 104 can be configured to retrieve the asset definition and attribute information from any asset management device associated with private network 112. As shown in FIG. 1A, network security device 104 can retrieve the asset definition and attribute information from any of the asset management devices, such as an external asset management device or system 102. The asset management devices can include any asset definition database or asset definition warehouse or Security Information or Event Management (SIEM) systems or Log based asset definition engine. As those skilled in the art will appreciate, the network asset management device can be internal to private network 112 or can be an external network asset management device that resides outside private network 112. For purpose of the present disclosure, retrieval of asset definition and attribute information by network security device 104 is described with reference to an external asset management device 102, but "external" in this context refers to the information being stored external to network security device 104—not necessarily external to private network 112. The external asset management device 102 can be internal to private network 112 or external to private network 112, a Virtual Machine (VM) systems, asset management systems and Security Information and Event Management (SIEM) systems. A typical VM system, for example, can be VMware VMX, Cisco ACI, etc. that allows a network administrator to define networking components, endpoints etc. easily and store asset definitions. Similarly, an external asset management device, for example, IBM Tivoli etc. could hold tens or hundreds of thousands of asset definitions. SIEM systems generally learn about assets based on logs, and may allow a network administrator to categorize/group the assets, depending on the capabilities of the SIEM system. External asset management device 102 can receive updated asset definition and attribute information from different sources.

As external asset management device 102 keeps track of updated information, which includes updated asset definition and attribute information associated with network assets 110a-n, network security device 104 can be configured to retrieve the asset definition and attribute information from external asset management device 102.

Whenever a new network asset is added to private network 112, network administrator may configure one or more security policy rules for the new network device. As shown in FIG. 1A, in order to facilitate configuration of security policies for an particular network asset, network security device 104 can retrieve asset definition and attribute information from external asset management device 102, thereby allowing the administrator to define the security policies. Network security device 104 can retrieve asset definition and attribute information from external asset management device 102 through polling. Network security device 104 can send polling requests for asset definition and attribute information of a network asset or a group of network assets. External assert management device 102 can send the asset definition and attribute information to network security device 104, which can store the asset definition and attribute information in a configuration management database (CMDB) 106 and further use it for configuration of security policies applied by network security device 104.

As those skilled in the art will appreciate, asset definition and attribute information for one or more of network assets 110a-n may change over time as they are used within private network 112. For example, when a network asset moves from one sub-net to another, the IP address and sub-net information may change, even though other asset definition and attribute information remains same. As those skilled in the art will appreciate, although the IP address and/or sub-net information of the moving network asset changes, it is desirable that the security policy rules (e.g., the rules defined to allow or block certain applications or scan certain network traffic) associated with the network asset remain in force without having to be manually changed by the network administrator and without the system configuration of the network security device being impacted. To continue applying the same set of security policy rules for the network asset, in traditional systems, it may be necessary to change the system configuration of the network security device and/or restart the network security device.

During run-time, network security device 104 can poll/retrieve for updated information, which includes asset definition and attribute information, of a network asset from external asset management device 102, and dynamically update the asset definition and attribute information of the network asset within the run-time security policy configuration of network security device 104 that is represented within kernel 108. This dynamic and real-time update of run-time kernel information may also be referred to herein as a kernel mode operation and may be performed independently of and without causing any changes in the system configuration of network security device 104 in the form of security policy configuration stored in CMDB 106. In this manner, the security policy rules associated with a network asset having changed definitions and/or attribute information can continue to be applied without interruption in kernel mode with the updated asset definition and attribute information.

In one embodiment, the updated information can be provided by external asset management device 102 to network security device 104 and other security device 114 through a push mechanism, wherein as soon as asset definition and attribute information of any network asset associated with private network 112 is updated, the updated information is pushed to network security device 104 and any other network security device (e.g., other security device 114) that needs to be kept synchronized with network security device 104.

In some embodiments, the updated information may be retrieved by network security device 104 from one or more external asset management devices associated with private network 112 through an active polling mechanism. For example, network security device 104 can retrieve or seek updated information associated with any particular network asset from external asset management device 102, in real-time before executing a security policy rule associated with the network asset. Alternatively, network security device 104 may poll external asset management device 102 on a periodic basis. Network security device 104 may retrieve the updated asset definition and attribute information from external asset management device 102 directly using a compatible Application Program Interface (API), such as a Representational State Transfer (REST) API or via a proprietary protocol.

Network security device 104 can be configured to retrieve updated information from different external asset management devices, instead of relying on a single external asset management device. Network security device 104 may have a defined priority of different external asset management devices. In one embodiment, a first API may be used for retrieving updated information from a first external asset management device of the one or more external asset management devices and a second API may be used for retrieving updated information from a second external asset management device of the one or more external asset management devices. Interaction between network security device and one or more external asset management devices can be pre-configured with respect to the API to be used.

Figure 1B:
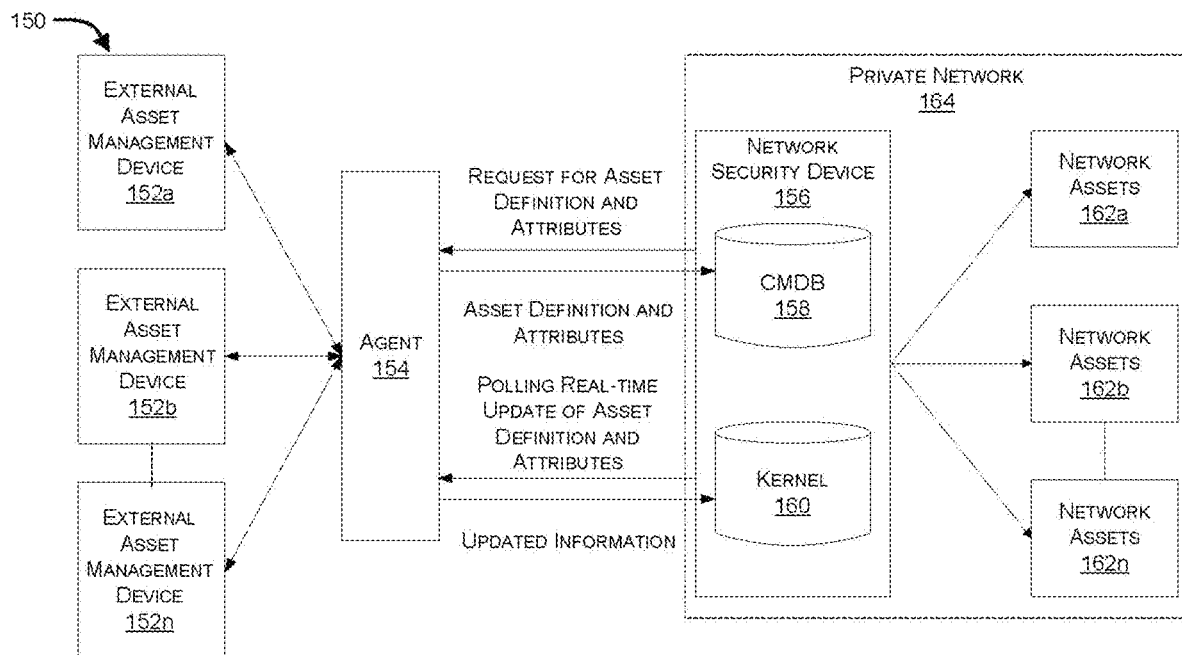
FIG. 1B is a block diagram illustrating a high-level architecture in which a network security device receives asset definitions and updated asset attributes from external devices via an agent or middleware in accordance with an embodiment of the present invention.

FIG. 1B is a block diagram illustrating a high-level architecture 150 in which a network security device 156 receives asset definitions and updated asset attributes from external devices via an agent 154 or middleware in accordance with an embodiment of the present invention. In the context of the present example, network security device 156 of a private network 164 can poll for asset definition and attribute information for one or more network assets 162*a-n* from one or more external asset management devices, such as external asset management device 152*a*, external asset management device 152*b*, and external asset management device 152*n*, through agent 154. In this manner, it is not necessary for network security device 156 to be compliant with different communication protocols being used by external asset management devices 152*a-n* as agent 154 will communicate directly with external asset management devices 152*a-n* on behalf of network security device 156. Network security device 156 can use a suitable protocol to communicate with agent 154, which in turn can use different APIs to communicate with external asset management devices 152*a-n*. In one embodiment, agent 154 may represent a management device (e.g., a FORTIMANAGER centralized security management device available from the assignee of the present invention) for performing centralized management of network security devices associated with a private network.

In one embodiment, the updated information may be retrieved, by network security device 156, from one or more external asset management devices 152*a-n*, through agent 154. In one embodiment, agent 154 may use a first API for retrieving the updated information from a first external asset management device of the one or more external asset management devices 152*a-n* and agent 154 may use a second API for retrieving the updated information from a second external asset management device of the one or more external asset management devices 152*a-n*.

During a configuration stage, network security device 156 can retrieve the asset definitions and attribute information associated with network assets 162*a-n* through agent 154 from one or more external asset management device 152*a-n* and store the configuration, and asset definition and attribute information in CMDB 158. Network security device 156 can poll for asset definition and attribute information to agent 154, which in turn can pull the asset definition and attribute information from any of external asset management devices 152*a-n*, and provide the asset definition and attribute information to allow for configuration of security policy rules.

During run-time, network security device 156 can retrieve updated information including updated asset definition and attribute information associated with network assets 162*a-n* through agent 154 from one or more external asset management devices 152*a-n* in real-time. Networks security device 156 can determine if the updated information relates to a network asset that is part of private network 164 and update the asset definition and attribute information dynamically within a representation of the security policy rules stored within a kernel 160 of a network security operating system of network security device 156, during execution of the security policy, without requiring a change to the system configuration stored in CMDB 158. In this manner, network security device 156 may automatically learn about changing asset definition and attribute information and update the system configuration independently of run-time changes.

When sending the request for retrieval of the asset definition and attribute information, network security device 156 can send an identifier associated with a particular network asset to get specific details or updates. In one embodiment, a general update request can be sent for retrieval of asset definition and attribute information of all the network assets associated with private network 164. In one embodiment, on receiving the asset definition and attribute information, network security devices 156 determines existence of a current definition and attribute information for the network asset at issue. Determination of existence of a current definition and attribute information may be based on a comparison of the current definition and attribute information with the updated information retrieved from the external asset management devices 152*a-c*. Network security device 156 may conclude that the updated information relates to a particular network asset when a match threshold is met, e.g., a majority of the current definition and most of the attributes information matches the updated information. For example, when updated information is retrieved from the external asset management device directly as shown in FIG. 1A or through agent 154 as shown in FIG. 1B, the network security device can determine that the asset definition and attribute information relates to a particular asset, if its name, domain, class, owner name etc. are the same and only its IP address has changed.

In one embodiment, network security device 156 can send a specific request for retrieval of specific attributes of the network asset to facilitate faster processing. In some embodiments, network security device 156 can apply machine learning to determine, for a specific network asset what types of attributes change over time, and hence can request updates for those specific attributes. In one embodiment, network security device 156 can be trained to conclude that the updated information relates to a network asset of private network 164 or that it relates to another network. Network security device 156 can be trained to understand what changes in the asset definition and attribute information should lead to the determination that the updated information relates to an existing asset definition and attribute information associated with an identified network asset. When the degree of change in asset definition and attribute information exceeds a predetermined or configurable threshold, network security device 156 may trigger an alert to prompt the network administrator to verify the determination. Input from the network administrator can be used as feedback for training the determination module of network security device 156.

In one embodiment, the updated information may be retrieved, by network security device 156, from one or more external asset management devices using a hybrid configuration in which updated information from a first external asset management device of the one or more external asset management devices may be retrieved directly by the network security device, and updated information from a second external asset management device of the one or more external asset management devices may be received indirectly through an agent.

Figure 2:
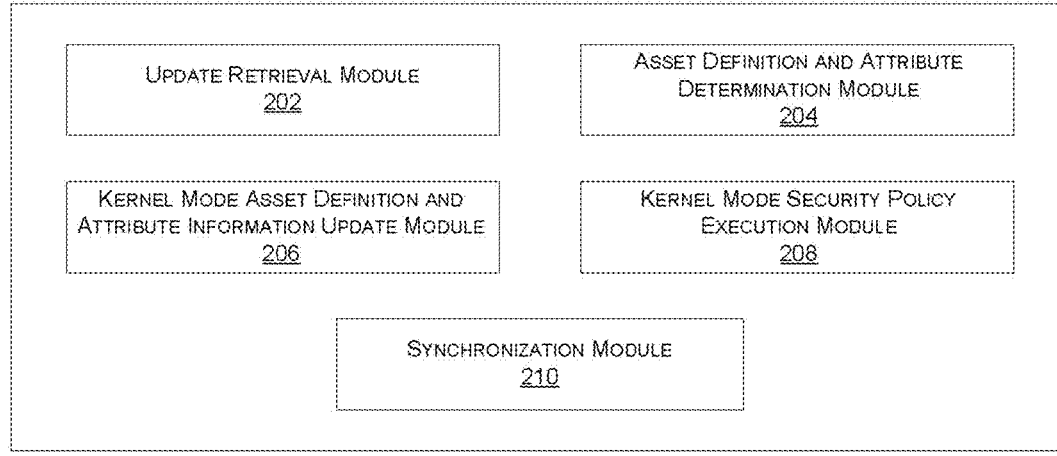
FIG. 2 is a block diagram illustrating exemplary functional modules of a system for executing security policy in kernel mode based on updated asset definitions retrieved from external devices in accordance with an embodiment of the present invention.

FIG. 2 illustrates exemplary functional modules of a system 200 for executing security policy in kernel mode based on updated asset definitions retrieved from external devices in accordance with an embodiment of the present invention. System 200 enables automated learning of externally defined network assets by a network security device. System 200 may execute the security policy in kernel mode based on updated information. That is, during run-time, a representation of the security policy rules may be locally stored within the kernel of the network security operating system and this representation may be updated in real-time to allow the security policy rules to continue to be applied despite a change to an asset definition or attribute information (e.g., an IP address or a subnet) of a network asset to which one or more current security policy rules relate. System 200 includes an update retrieval module 202 configured, at a network security device, to receive updated information associated with a network asset of a private network, from an external asset management device associated with the private network, an asset definition and attribute determination module 204 configured, at the network security device, to determine existence of a current definition and attribute information for the network asset, and a kernel mode asset definition and attribute information update module 206 configured, at the network security device, to dynamically update in kernel mode, the current definition and attribute information based on the updated information, without disrupting ongoing application of one or more security policy rules defined for the network asset relating to how to handle network traffic directed to or originated by the network asset.

In one embodiment, update retrieval module 202 can be configured to receive the updated information in real-time, at the network security device, from the external asset management device through a push or poll mechanism. In one embodiment, update retrieval module 202 can be configured to receive updated information from one or more external asset management devices. Update retrieval module 202 may receive updated information from one or more external asset management devices and to the extent conflicting information is received from different sources can consider the source that holds the most recently updated information as the most reliable source. The external asset management device can be configured to send the updated information along with a timestamp indicating when the last update was made. In one embodiment, it is possible that different external asset management devices holds different parts of the asset definition and attribute information for the same network asset. In one embodiment, the network security device can be configured to seek/receive respective parts of the asset definition and attribute information form respective external management devices. In one embodiment, part of the asset definition and attribute information may be received from a first external asset management device, and another part of the asset definition and attribute information may be received from a second external asset management device. For example, it is possible that one external asset management device maintains IP addresses of network assets and another external asset management device maintains other parts of the asset definition and attribute information, such as ownership details, group details etc. System 200 can be configured to retrieve specific parts of asset definition and attribute information from a pre-defined external asset management.

Those skilled in the art will appreciate that the external asset management device, which may also be referred to as an asset management device, may be any computing device that stores updated asset definition and attribute information for network assets of a private network. For purposes of the present disclosure, it is assumed that the asset management devices keep track of changing asset definition and attribute information for each network asset associated with the private network.

In one embodiment, update retrieval module 202 can be configured to receive updated information from the external asset management device as part of an initialization/configuration stage to facilitate generation of security policy rules for a network asset to be applied by the network security device. In one embodiment, system 200 can be configured to receive updated information from the external asset management device through polling during run-time of the security policy in kernel mode. An appropriate API can be invoked to retrieve updated information from the external asset management device. Different APIs can be used for communication between the network security device and different asset management devices. In one embodiment, a first API can used for receiving updated information from a first asset management device and a second API can be used for receiving updated information from a second asset management device. The network security device can be configured to be compatible with one or more APIs to receive updated information from different asset management device.

As APIs being used by the asset management devices differ, it may not be feasible for the network security device to be compatible with all the APIs and proprietary protocols used by some asset management devices. To overcome this issue, in one embodiment, system 200 can be configured to use an agent that can enable communication between the network security device and one or more asset management devices. In one embodiment, the agent can be configured to transform the request or reply or any message received from an asset management device to a format suitable for communication with the network security device. In one embodiment, the agent can use different APIs and proprietary protocols to enable exchange of updated information between the network security device and one or more asset management devices. In one embodiment, the updated information may be retrieved, by the network security device, from one or more external asset management devices using a hybrid configuration in which updated information from a first external asset management device of the one or more external asset management devices may be retrieved directly by the network security device, and updated information from a second external asset management device of the one or more external asset management devices may be received indirectly through an agent.

In one embodiment, system 200 can request/poll for updated information relating to a specific network asset or a group of network assets. In one embodiment, a group of network assets for which system 200 requests for updated information can be determined based on relation or interdependency or security policies. In one embodiment, the updated information may be retrieved by the network security device from one or more external asset management devices associated with the private network through a push mechanism, wherein, the updated information is pushed to the network security device, responsive to a change to a definition and/or attributes of any network asset associated with the private network. In some embodiments, the updated information may be retrieved by the network security device from one or more external asset management devices associated with the private network through an active polling mechanism.

In one embodiment, asset definition and attribute determination module 204 can be configured to determine existence of a current definition and attribute information for a particular network asset. The determination of existence of a current definition and attribute information for the network asset may be based on a comparison of the current definition and attribute information (e.g., locally stored within the kernel of the network security operating system of the network security device) with the updated information. In one embodiment, the network security device concludes that the updated information relates to a particular network asset when a majority of the current definition and most of the attributes information matches the updated information. In one embodiment, asset definition and attribute determination module 204 can be configured to use machine learning to determine that the updated information relates to a network asset for which the network security device has existing definition and attribute information, which may also be referred to herein interchangeably as current definition and attribute information. In this manner, system 200 can determine based on the received asset definition and attribute information, a network asset to which the updated information pertains when such context is not otherwise available based on a request made by the network security device, for example.

In one embodiment, kernel mode asset definition and attribute information update module 206 can be configured to dynamically update the current definition and attribute information stored in the kernel during run-time of the security policy without requiring any change to the system configuration (e.g., the security policy rules generated by the network administrator and the asset definition and attribute information stored in a CMDB) of the network security device. As such, the current definition and attribute information may be updated during run-time, without disrupting ongoing application of one or more security policy rules defined for a network asset whose definition or attributes have been updated within an external asset management device. In this manner, kernel mode asset definition and attribute information update module 206 doesn't permanently update the asset definition and attribute information of the network asset at the networks security device (which can be automatically learned or manually updated by other means), but rather simply allows any changes in asset definition and attribute information for network assets to be taken into consideration during ongoing run-time application of security policy rules relating to such network assets.

In one embodiment, system 200 can include a kernel mode security policy execution module 208 configured, at the network security device in kernel mode, to execute one or more security policy rules associated with the network asset based on updated information, without causing any change in the system configuration of the network security device.

In one embodiment, system 200 can also include a synchronization module 210 configured to synchronize current definition and attribute information with other network security devices associated with the private network, wherein the network security device can push the updated information to other network security devices and other network security device can update in kernel mode the current definition and attribute information of the network asset based on the updated information.

In one embodiment, system 200 can allow network administrator to configure a single network asset or group of network assets at a time, at the network security device. Polling internally can be configured in similar manner, individually for each network assets or collectively for a group of network assets. In one embodiment, the group of network assets can be created automatically based on similarity of asset definition and attribute information. In one embodiment, the group of network assets can be created by the network administrator. In one embodiment, the network security device can be configured to retrieve or receive asset definition and attribute information for one network asset or group of network assets. Based on the received updated information, current asset definition and attribute information can be updated, in kernel mode, for a single network asset or for group of network assets.

Figure 3:
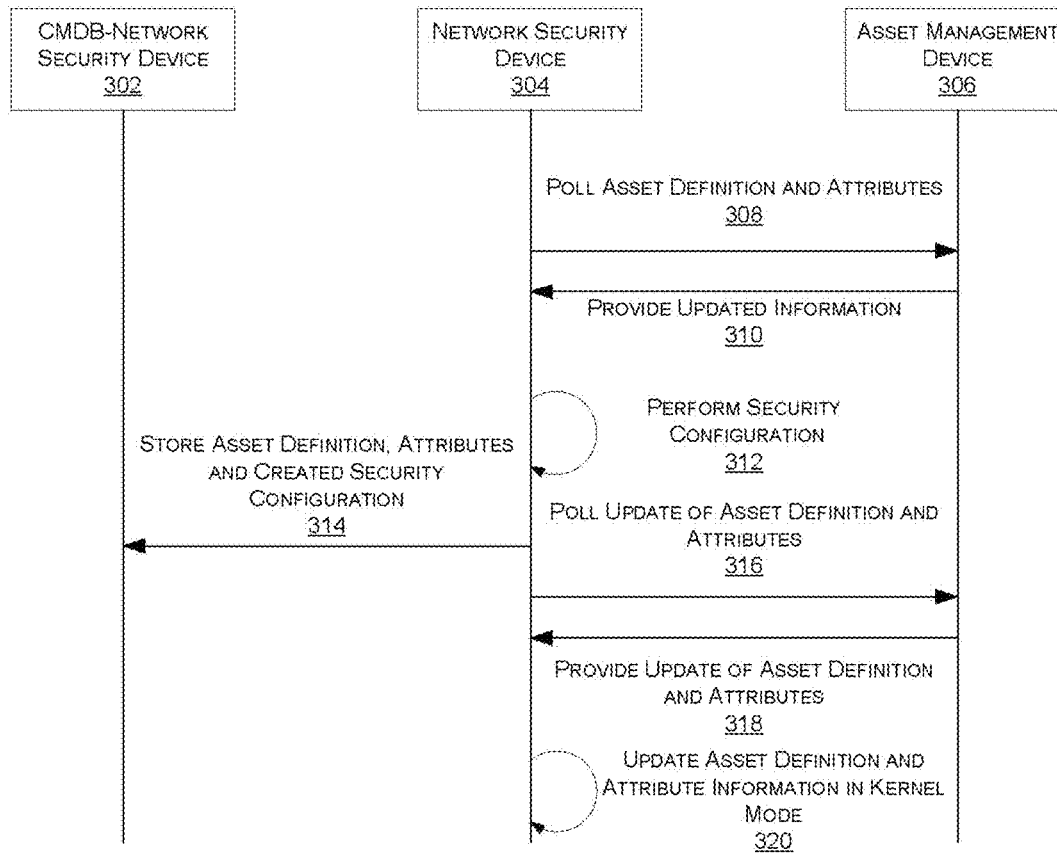
FIG. 3 is a sequence diagram illustrating interactions between a network security device and a configuration management database (CMDB) and an asset management device in accordance with an embodiment of the present invention.

FIG. 3 is a sequence diagram 300 illustrating interactions between a network security device 304 and a configuration management database (CMDB) 302 and an asset management device 306 in accordance with an embodiment of the present invention.

In the context of the present example, network security device 304 polls asset definition and attribute information 308 from asset management device 306, which provides updated information 310 containing asset definition and attribute information. In one embodiment, network security device 304 can send a polling request for a specific network asset or for a group of network assets. Network security device 304 can use the updated information to perform security configuration 312 (e.g., generation of security policy rules relating to the network assets). After security configuration, network security device 304 can store the asset definition and attribute information along with created security configuration 314 within CMDB 302 of network security device 304. After the security configuration associated with network assets has been completed, during run-time application of the security configuration, network security device 304 can continue polling for updated information for the network assets so as to allow security policy rules defined for the network assets to continue to be applied without interruption despite a subsequent change to asset definition and attribute information for one or more of the network assets.

In one embodiment, network security device 304 can request for an update of asset definition and attribute information 316 for a particular network asset from asset management device 306 prior to executing a security policy rule relating to the particular network asset to capture any intervening changes to asset definition and attribute information for the particular network asset. For example, before executing the security policy rule, network security device 304 can send a polling request and receive the updated information. The updated information can then be used to update the current asset definition and attribute information and execute the security policy rule, in kernel mode as shown at step 320 with the updated asset definition and attribute information. Notably, in one embodiment, updated information is used for updating the asset definition and attribute information in kernel mode, and is not used to update or otherwise change information stored in CMDB 302. In one embodiment, when the difference between updated asset definition and attribute information being used during run-time application of security policy rules in kernel mode, and current asset definition and attribute information stored in CMDB 302 exceeds a predefined or configurable threshold, network security device 304 may alert the network administrator to update the asset definition and attribute information in CMDB 302. In an exemplary implementation, if the network security device 304 observes over a period of time that the updated information associated with a network asset is consistent, network security device 304 can recommend the asset definition and attribute information to be updated in CMDB 302 as well.

Figure 4:
FIG. 4 illustrates a configuration screen of a graphical user interface through which a network administrator may establish a polling interval for requesting asset definitions and attributes of specified groups of network assets from external systems in accordance with an embodiment of the present invention.

FIG. 4 illustrates a configuration screen 400 of a graphical user interface through which a network administrator may establish a polling interval for requesting asset definitions and attributes of network assets or groups thereof from external systems in accordance with an embodiment of the present invention. In the context of the present example, configuration screen 400 provides a network administrator with the ability to establish a polling interval for a Software Defined Networking (SDN) connector for requesting updates regarding asset definitions and attributes of one or more groups of networks assets maintained by an external asset management device. Configuration screen 400 may include a radio button allowing for specification of a type 402 of SDN connector to be used for communicating with the external asset management system that is to be polled, a text field for entry of IP address 404 of the external asset management system from which the asset definition and attribute information is to be retrieved, and text entry fields for supplying user credentials, such as user name 406 and password 408 to allow the external asset management system to authenticate the network administrator and determine whether the administrator is authorized to access the asset definition and attribute information. The authentication can be performed at the external asset management device to determine if the asset definition and attribute information can be provided or not. In an exemplary implementation, authentication can independently be performed by a Lightweight Directory Access Protocol (LDAP) server. Configuration screen 400 can also provide an option for specifying a polling interval 410 for the specified network assets or groups of network assets. In the context of the present example, configuration screen 400 enables polling of asset definition and attribute information stored by an external asset management system via a VMware NSX type connector or an Amazon Web Services (AWS) connector. Configuration screen 400 also allows the administrator to define a polling interval. For example, the administrator can set polling to be automatically performed every 10 seconds. In one embodiment, one or more external asset management devices from which initial asset definition and attribute information, and updated information are to be retrieved can be pre-configured. After basic details, such as IP address 404, username 406, password 408 etc. are provided, the administrator can click on query object list 412 button to retrieve names of the network objects (assets) or groups of network objects (assets) 414 for which asset definition and attribute information is available on the external asset management device at issue. The network administrator can use retrieved details for configuring security policy rules, via a separate policy configuration screen, for example, to be applied by the network security device for the network assets. As those skilled in the art will appreciate, configuration screen 400 is merely exemplary and can be used to establish as many SDN connectors as are needed to poll all of the desired external asset management devices.

In one embodiment, after the security policies have been configured for the network assets and the network security device is actively applying them to network traffic, the network security device will receive updated asset definitions and attributes information at regular intervals as specified via configuration screen 400. For example, in the present example, network security device will automatically receive updated information for network assets associated with securitygroup-131, securitygroup132 and Servergroup-1 from the external asset management device every 10 second. As described above, in one embodiment, the network security device can be configured with learning based dynamic polling interval, wherein the network security device can learn based on traffic behavior, how fast or which portions of the asset definition and attribute information of a network asset is changing, and can initiate the polling request accordingly to obtain the updated information. In one implementation, the polling request for updated information relating to a network asset can be initiated on demand when the security policy related to the network asset is be to be executed at the network security device.

For each network asset or group of network assets, security policies to be executed/applied by network security device can be configured. Security policies can be defined using different asset definition and attribute information for incoming and outgoing traffic. The administrator can define policies, such as an action to be taken (e.g., accept, deny, learn) for a combination of: a specified incoming interface, a specified outgoing interface, one or more defined source IP addresses, one or more defined destination IP addresses and one or more services in accordance with a defined schedule. Over time, as some part of the asset definition and attribute information changes, it is desirable to continue to apply the security policy rules defined for the network assets. The network security device can retrieve the updated information from external asset management device and dynamically update the asset definition and attribute information and associated security policy rules in kernel mode, without impacting the system configuration of the network security device.

Figure 5:
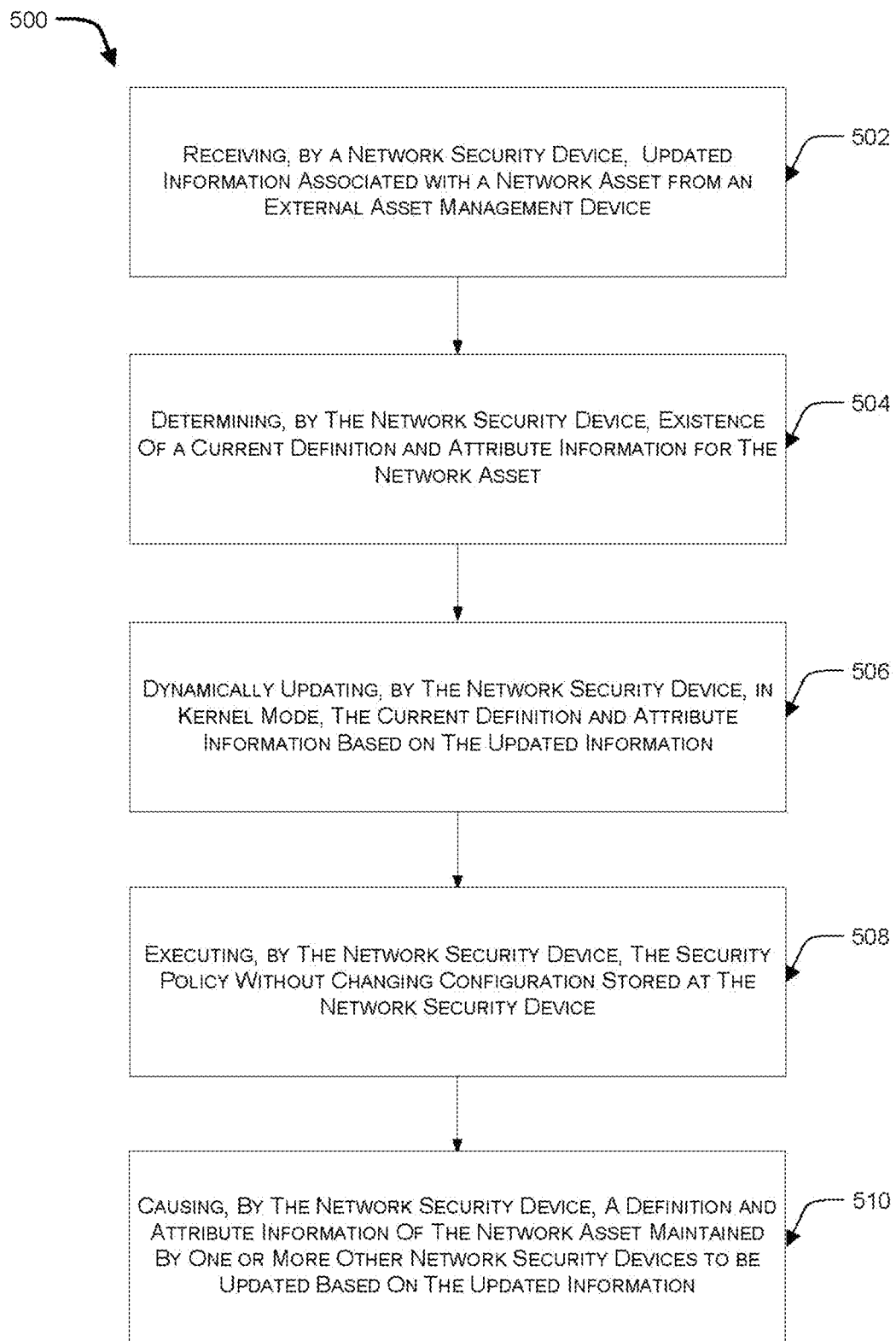
FIG. 5 is a flow diagram illustrating the ability of a network security device to update an attribute of a network asset for which a security policy exists without interrupting application of the security policy in accordance with an embodiment of the present invention.

FIG. 5 is a flow diagram illustrating the ability of a network security device to update an attribute of a network asset for which a security policy exists without interrupting application of the security policy in accordance with an embodiment of the present invention. Described herein, is a method to dynamically update run-time security policy and asset definition and attribute information of a network asset so as to facilitate continued application of corresponding security policy rules without affecting the system configuration of the network security device. The method includes steps of receiving, by a network security device updated information associated with a network asset from an external asset management device as shown at step 502, determining, by the network security device, existence of a current definition and attribute information for the network asset, as shown at step 504, and dynamically updating, by the network security device, in kernel mode the current definition and attribute information based on the updated information as shown at step 506. In one embodiment, current definition and attribute information is updated in kernel mode based on updated information, without disrupting ongoing application of a security policy defined for the network asset to network traffic directed to or originated by the network asset. In one embodiment, the updated information includes a change in a definition or an attribute of the network asset.

In one embodiment, the network security device may be associated with a private network, and the external asset management device may be the one that is configured to maintain asset definition of network assets associated with the private network. An external asset management device configured to maintain and keep record of changing asset definition and attribute information of network assets of the private network is also referred as an external asset management device associated with the private network.

In one embodiment, determination of existence of a current definition and attribute information for the network asset may be based on a comparison of the current definition and attribute information with the updated information. The network security device concludes that the updated information relates to the network asset when most of the current definition and most of the attribute information matches the updated information.

In one embodiment, the updated information may be retrieved directly from one or more external asset management devices using different APIs. In one embodiment, a first application programming interface (API) may be used for retrieving the updated information from a first external asset management device of the one or more external asset management devices and a second API may be used for retrieving updated information from a second external asset management device of the one or more external asset management devices.

In one embodiment, the updated information may be retrieved, by the network security device, from one or more external asset management devices, through an agent. The agent may use a first API for retrieving the updated information from a first external asset management device of the one or more external asset management devices and the agent may use a second API for retrieving the updated information from a second external asset management device of the one or more external asset management devices.

In one embodiment, the updated information may be received, by the network security device, from one or more external asset management devices using a hybrid configuration. In hybrid configuration, updated information from a first external asset management device of the one or more external asset management devices may be retrieved directly by the network security device, and updated information from a second external asset management device of the one or more external asset management devices may be received indirectly through an agent.

The network security device may be any or a combination of an Intrusion Prevention System (IPS), an Intrusion Detection System (IDS), a gateway device, a network controller device, a firewall, a Distributed Denial of Service (DDoS) prevention device, and a software defined network security device.

In one embodiment, the change in the definition or the attribute may represent a change to one or more of an asset name of the network asset, a sub-net within which the network asset is connected, an off-site hostname to which the network asset belongs, a location of the network asset and a group with which the network asset is associated. The change in the definition or the attribute may represent a change to one or more of an Internet Protocol (IP) address of the network asset, a Media Access Control (MAC) address of the network asset, a user ID and an exposure level.

In one embodiment, the method further includes the step of executing, by the network security device, the security policy without changing the system configuration of the network security device as shown at step 508.

In one embodiment, the method can further include the step of causing, by the network security device, a definition or an attribute of the network asset maintained by one or more other network security devices associated with the private network to be updated based on the updated information, as shown at step 510. This step can reduce the burden on other network security devices of the private network, as they will not have to poll the external asset management device(s) and wait for updates. In this manner, updates in asset definition and attribute information can be synched among multiple network security devices associated with the private network.

Figure 6:
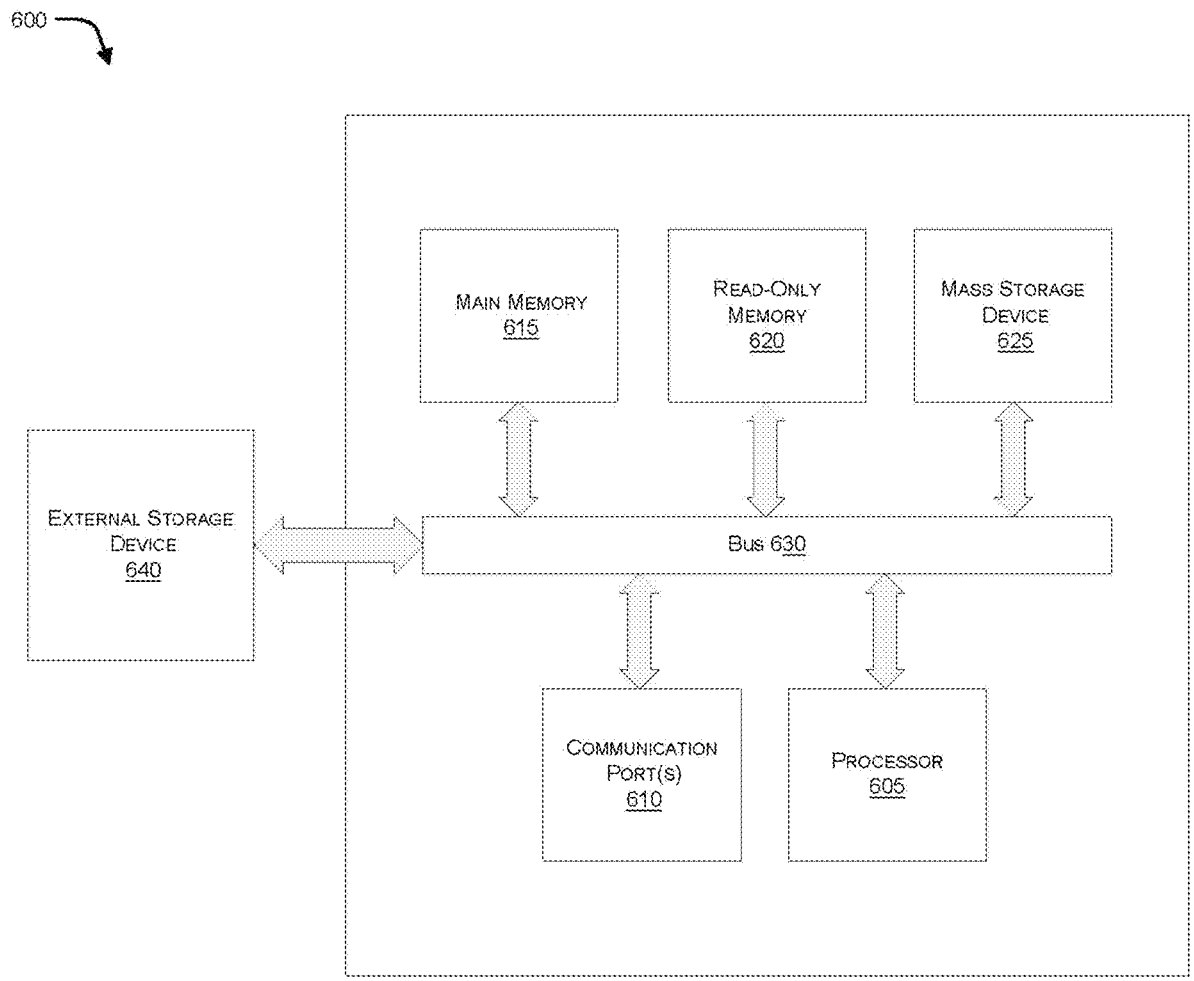
FIG. 6 illustrates an exemplary computer system in which or with which embodiments of the present invention may be utilized.

FIG. 6 illustrates an exemplary computer system in which or with which embodiments of the present invention may be utilized. Computer system 600 may represent or form a part of a network security device (e.g., network security device 104, 156 and/or 304) and can be configured for implementation of system 200 and execution of steps of method 500 described above.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a Read-Only Memory (RAM) 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C, . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
    receiving, by a network security device associated with a private network, updated information associated with a network asset associated with the private network from an external asset management device associated with the private network, wherein the updated information includes a change in a definition or an attribute of the network asset;
    determining, by the network security device, existence of a current definition and attribute information for the network asset; and
    without disrupting on-going application of a plurality of security policy rules, including one or more security policy rules defined for the network asset and relating to network traffic directed to or originated by the network asset, by the network security device, dynamically updating, by the network security device, the current definition and attribute information within a run-time representation of the one or more security policy rules within a kernel of a network security operating system of the network security device based on the updated information.

2. The method of claim 1, wherein said determining is based on a comparison of the current definition and attribute information with the updated information, wherein the network security device concludes that the updated information relates to the network asset when a majority of the current definition and most of the attributes information matches the updated information.

3. The method of claim 1, further comprising causing a definition or an attribute of the network asset maintained by one or more other network security devices associated with the private network to be updated based on the updated information.

4. The method of claim 1, wherein the updated information is retrieved directly from one or more external asset management devices, wherein a first application programming interface (API) is used for retrieving the updated information from a first external asset management device of the one or more external asset management devices and a second API is used for retrieving updated information from a second external asset management device of the one or more external asset management devices.

5. The method of claim 1, wherein the updated information is retrieved, by the network security device, from one or more external asset management devices, through an agent, wherein the agent uses a first API for retrieving the updated information from a first external asset management device of the one or more external asset management devices and the agent uses a second API for retrieving the updated information from a second external asset management device of the one or more external asset management devices.

6. The method of claim 1, wherein the updated information is retrieved, by the network security device, from one or more external asset management devices using a hybrid configuration in which updated information from a first external asset management device of the one or more external asset management devices is retrieved directly by the network security device, and updated information from a second external asset management device of the one or more external asset management devices is received indirectly through an agent.

7. The method of claim 1, wherein the network security device comprises any or a combination of an Intrusion Prevention System (IPS), an Intrusion Detection System (IDS), a gateway device, a network management device, a firewall, a Distributed Denial of Service (DDoS) prevention device, a Unified Threat Management (UTM) appliance and a software defined network security device.

8. The method of claim 1, wherein the change in the definition or the attribute represents a change to one or more of an asset name of the network asset, a subnet within which the network asset is connected, an off-site hostname to which the network asset belongs, a location of the network asset and a group with which the network asset is associated.

9. The method of claim 1, wherein the change in the definition or the attribute represents a change to one or more of an Internet Protocol (IP) address of the network asset, a Media Access Control (MAC) address of the network asset, a user ID and an exposure level.

10. The method of claim 1, wherein said dynamically updating, by the network security device, the current definition and attribute information within a run-time representation of the one or more security policy rules within a kernel of a network security operating system of the network security device is performed without impacting a system configuration of the network security device.

11. A non-transitory computer-readable storage medium embodying a set of instructions, which when executed by one or more processors of a network security device associated with a private network, causes the one or more processors to perform a method comprising:
receiving updated information associated with a network asset associated with the private network from an external asset management device associated with the private network, wherein the updated information includes a change in a definition or an attribute of the network asset;
determining existence of a current definition and attribute information for the network asset; and
without disrupting on-going application of a plurality of security policy rules, including one or more security policy rules defined for the network asset and relating to network traffic directed to or originated by the network asset, dynamically updating the current definition and attribute information within a run-time representation of the one or more security policy rules within a kernel of a network security operating system of the network security device based on the updated information.

12. The non-transitory computer-readable storage medium of claim 11, wherein said determining is based on a comparison of the current definition and attribute information with the updated information, wherein the network security device concludes that the updated information relates to the network asset when a majority of the current definition and most of the attributes information matches the updated information.

13. The non-transitory computer-readable storage medium of claim 11, wherein the method further comprises causing a definition or an attribute of the network asset maintained by one or more other network security devices associated with the private network to be updated based on the updated information.

14. The non-transitory computer-readable storage medium of claim 11, wherein the updated information is retrieved directly from one or more external asset management devices, wherein a first application programming interface (API) is used for retrieving the updated information from a first external asset management device of the one or more external asset management devices and a second API is used for retrieving updated information from a second external asset management device of the one or more external asset management devices.

15. The non-transitory computer-readable storage medium of claim 11, wherein the updated information is retrieved from one or more external asset management devices, through an agent, wherein the agent uses a first API for retrieving the updated information from a first external asset management device of the one or more external asset management devices and the agent uses a second API for retrieving the updated information from a second external asset management device of the one or more external asset management devices.

16. The non-transitory computer-readable storage medium of claim 11, wherein the updated information is retrieved from one or more external asset management devices using a hybrid configuration in which updated information from a first external asset management device of the one or more external asset management devices is retrieved directly by the network security device, and updated information from a second external asset management device of the one or more external asset management devices is received indirectly through an agent.

17. The non-transitory computer-readable storage medium of claim 11, wherein the network security device comprises any or a combination of an Intrusion Prevention System (IPS), an Intrusion Detection System (IDS), a gateway device, a network management device, a firewall, a Distributed Denial of Service (DDoS) prevention device, a Unified Threat Management (UTM) appliance and a software defined network security device.

18. The non-transitory computer-readable storage medium of claim 11, wherein the change in the definition or the attribute represents a change to one or more of an asset name of the network asset, a subnet within which the network asset is connected, an off-site hostname to which the network asset belongs, a location of the network asset and a group with which the network asset is associated.

19. The non-transitory computer-readable storage medium of claim 11, wherein the change in the definition or the attribute represents a change to one or more of an Internet Protocol (IP) address of the network asset, a Media Access Control (MAC) address of the network asset, a user ID and an exposure level.

20. The non-transitory computer-readable storage medium of claim 11, wherein said dynamically updating the current definition and attribute information within a run-time representation of the one or more security policy rules within a kernel of a network security operating system of the network security device is performed without impacting a system configuration of the network security device.

21. A network security device comprising:
a processor; and
a non-transitory computer-readable storage medium embodying a set of instructions, which when executed by the processor to perform a method comprising:
receiving updated information associated with a network asset associated with a private network from an external asset management device associated with the private network, wherein the updated information includes a change in a definition or an attribute of the network asset;
determining existence of a current definition and attribute information for the network asset; and
without disrupting on-going application of a plurality of security policy rules, including one or more security policy rules defined for the network asset and relating to network traffic directed to or originated by the network asset, dynamically updating the current definition and attribute information within a run-time representation of the one or more security policy rules within a kernel of a network security operating system of the network security device based on the updated information.

22. The system of claim 21, wherein said determining is based on a comparison of the current definition and attribute information with the updated information, wherein the network security device concludes that the updated information relates to the network asset when a majority of the current definition and most of the attributes information matches the updated information.

23. The system of claim 22, wherein the method further comprises causing a definition or an attribute of the network asset maintained by one or more other network security devices associated with the private network to be updated based on the updated information.

24. The system of claim 22, wherein the updated information is retrieved directly from one or more external asset management devices, wherein a first application programming interface (API) is used for retrieving the updated information from a first external asset management device of the one or more external asset management devices and a second API is used for retrieving updated information from a second external asset management device of the one or more external asset management devices.

25. The system of claim 22, wherein the updated information is retrieved from one or more external asset management devices, through an agent, wherein the agent uses a first API for retrieving the updated information from a first external asset management device of the one or more external asset management devices and the agent uses a second API for retrieving the updated information from a second external asset management device of the one or more external asset management devices.

26. The system of claim 22, wherein the updated information is retrieved from one or more external asset management devices using a hybrid configuration in which updated information from a first external asset management device of the one or more external asset management devices is retrieved directly by the network security device, and updated information from a second external asset management device of the one or more external asset management devices is received indirectly through an agent.

27. The system of claim 22, wherein the network security device comprises an Intrusion Prevention System (IPS), an Intrusion Detection System (IDS), a gateway device, a network management device, a firewall, a Distributed Denial of Service (DDoS) prevention device, or a Unified Threat Management (UTM) appliance.

28. The system of claim 22, wherein the change in the definition or the attribute represents a change to one or more of an asset name of the network asset, a subnet within which the network asset is connected, an off-site hostname to which the network asset belongs, a location of the network asset and a group with which the network asset is associated.

29. The system of claim 22, wherein the change in the definition or the attribute represents a change to one or more of an Internet Protocol (IP) address of the network asset, a Media Access Control (MAC) address of the network asset, a user ID and an exposure level.

30. The system of claim 22, wherein said dynamically updating the current definition and attribute information within a run-time representation of the one or more security policy rules within a kernel of a network security operating system of the network security device is performed without impacting a system configuration of the network security device.

* * * * *